(12) United States Patent
Macrae et al.

(10) Patent No.: US 8,844,618 B2
(45) Date of Patent: Sep. 30, 2014

(54) SMART DROP-OFF TOOL AND HANG-OFF TOOL FOR A LOGGING STRING

(75) Inventors: Jonathan Macrae, Houston, TX (US); Bulent Finci, Sugar Land, TX (US); James G. Aivalis, Katy, TX (US); Peter Wells, Houston, TX (US); Robert Crispin Porter, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 396 days.

(21) Appl. No.: 13/182,493

(22) Filed: Jul. 14, 2011

(65) Prior Publication Data

US 2013/0014934 A1    Jan. 17, 2013

(51) Int. Cl.
| | | |
|---|---|---|
| *E21B 31/12* | (2006.01) | |
| *E21B 47/00* | (2012.01) | |
| *G01V 11/00* | (2006.01) | |
| *E21B 43/10* | (2006.01) | |
| *E21B 47/12* | (2012.01) | |
| *E21B 47/01* | (2012.01) | |

(52) U.S. Cl.
CPC .............. *G01V 11/005* (2013.01); *E21B 47/00* (2013.01); *E21B 43/103* (2013.01); *E21B 47/124* (2013.01); *E21B 47/011* (2013.01)
USPC ........... 166/98; 166/301; 166/66; 166/250.01

(58) Field of Classification Search
USPC ............ 166/250.01, 382, 66, 66.4, 254.2, 98, 166/301; 294/86.33
See application file for complete search history.

(56) References Cited

U.S. PATENT DOCUMENTS

| | | | |
|---|---|---|---|
| 4,116,274 A | | 9/1978 | Rankin et al. |
| 4,488,597 A | | 12/1984 | Hoppe et al. |
| 4,856,582 A | * | 8/1989 | Smith et al. ...................... 166/98 |
| 5,180,011 A | | 1/1993 | Wittrisch |
| 5,278,550 A | * | 1/1994 | Rhein-Knudsen et al. 340/855.1 |
| 5,335,737 A | | 8/1994 | Baugh |
| 5,477,921 A | * | 12/1995 | Tollefsen ................. 166/250.13 |
| 6,119,777 A | | 9/2000 | Runia |
| 6,170,573 B1 | | 1/2001 | Brunet et al. |
| 6,419,013 B1 | | 7/2002 | Milne et al. |
| 6,578,631 B2 | | 6/2003 | Milne et al. |
| 7,114,563 B2 | | 10/2006 | Rose |
| 7,215,125 B2 | * | 5/2007 | Clark ........................... 324/368 |
| 7,296,639 B2 | | 11/2007 | Millar et al. |

(Continued)

OTHER PUBLICATIONS

Matula, Chuck, "Lower Risk by Logging Through the Bit," retrieved Mar. 16, 2009 from http://www.epmag.com/article/print/28634 (Jan. 29, 2009), pp. 1-2.

(Continued)

*Primary Examiner* — Giovanna Wright
(74) *Attorney, Agent, or Firm* — Chamberlain Hrdlicka (57) ABSTRACT

A hang-off tool for supporting a tool inside a tubular member includes a logging string configured to generate logging data, a computing system coupled to the logging string and configured to communicate the logging data to another tool, and a radially expandable member having a retracted position and an expanded position. The radially expandable member is configured to engage a radially-increased profile of an inner surface of the tubular member in the expanded position to support the hang-off tool. The radially expandable member is also configured not to engage the radially-increased profile in the retracted position.

13 Claims, 4 Drawing Sheets

(56) References Cited

U.S. PATENT DOCUMENTS

| | | | |
|---|---|---|---|
| 7,537,061 | B2 | 5/2009 | Hall et al. |
| 7,681,642 | B2 | 3/2010 | Bell et al. |
| 7,857,066 | B2 | 12/2010 | DiFoggio et al. |
| 7,874,359 | B2 | 1/2011 | Bissonnette et al. |
| 8,397,815 | B2 * | 3/2013 | MacDougall et al. ........ 166/301 |
| 2001/0039477 | A1 | 11/2001 | Xiao et al. |
| 2004/0134667 | A1 | 7/2004 | Brewer et al. |
| 2007/0284116 | A1 | 12/2007 | Hall |
| 2008/0202767 | A1 | 8/2008 | Sheiretov et al. |
| 2009/0139724 | A1 * | 6/2009 | Gray et al. .................... 166/345 |
| 2009/0151940 | A1 | 6/2009 | Malone |
| 2009/0194271 | A1 | 8/2009 | Bissonnette et al. |
| 2010/0096187 | A1 | 4/2010 | Storm, Jr. et al. |
| 2010/0126734 | A1 | 5/2010 | Eirksen |
| 2011/0031023 | A1 | 2/2011 | Menezes et al. |

OTHER PUBLICATIONS

Mahony, James, "Through-Bit Technology May Brighten the Outlook for Tough Logging Conditions," New Technology Magazine (Sep. 2004), pp. 1-3.

Corporate Brochure retrieved Aug. 9, 2012 from www.ThruBit.com. "ThruBit Logging Solutions," pp. 1-4.

Runia, John, et al., "Technologies Leading Way to New Through-Bit, Through-Bore Capabilities in Well Logging and Drilling," The American Oil and Gas Reporter, pp. 68-77.

PCT Search Report and Written Opinion for PCT/US2012/046220, dated Jan. 21, 2013.

Runia, John, et al., "Through Bore Drilling Systems: A New Drilling Option," SPE/IADC 79794 Drilling Conference, Amsterdam, The Netherlands, Feb. 19-21, 2003 (10 p.).

Runia, John, et al., "Through Bit Logging: A New Method to Acquire Log Data, and a First Step on the Road to Through Bore Drilling," SPWLA 45th Annual Logging Symposium, Jun. 6-9, 2004 (8 p.).

Runia, John, et al., "Through Bit Logging: Applications in Difficult Wells, Offshore North Sea," SPE/IADC 92256 Drilling Conference, Amsterdam, The Netherlands, Feb. 23-25, 2005 (8 p.).

Runia, John, et al., "Through Bit Logging: A New Method to Acquire Log Data," Petrophysics, vol. 46, No. 4, Aug. 2005, pp. 289-294 (6 p.).

Blount, C.G., et al., "Inflatable CT Conveyed Selective Well Testing System for Logging Openhole and Horizontal Wellbores: Development and Use," SPE/ICOTA Coiled Tubing Conference and Exhibition, Apr. 8-9, 2003, Houston, Texas (1 p.).

* cited by examiner

SMART DROP-OFF TOOL AND HANG-OFF TOOL FOR A LOGGING STRING

BACKGROUND

In hydrocarbon drilling operations, a logging string system is lowered through a drill string or downhole tubular. The logging string system includes a logging tool that takes various measurements, which may range from common measurements such as pressure or temperature to advanced measurements such as rock properties, fracture analysis, fluid properties in the wellbore, or formation properties extending into the rock formation. In some cases, the logging tool is suspended on a shoulder inside the drill string; that is, the logging tool may extend below the drill bit, but further downward movement is prevented because a radially extended portion of the logging string system rests on an interior shoulder of the drill string. Requiring a shoulder inside the drill string reduces the inner diameter of the drill string, which in turn limits the maximum allowed diameter of the logging string system.

SUMMARY OF DISCLOSED EMBODIMENTS

In one embodiment, a hang-off tool for supporting a tool inside a tubular member includes a logging string configured to generate logging data, a computing system coupled to the logging string and configured to communicate the logging data to another tool, and a radially expandable member having a retracted position and an expanded position. The radially expandable member is configured to engage a radially-increased profile of an inner surface of the tubular member in the expanded position to support the hang-off tool. The radially expandable member is also configured not to engage the radially-increased profile in the retracted position.

In another embodiment, a drop-off tool for transporting another tool inside a tubular includes a tool body coupled to a suspension element at a proximal end. The tool body includes a release latch at a distal end configured to engage a fishing neck on the other tool, a motor configured to actuate the release latch to disengage the other tool, and a communication chassis configured to establish communication between the other tool and the suspension element.

In yet another embodiment, a hang-off tool for supporting a tool inside a tubular member includes a means for engaging a profile of an inner surface of the tubular member, a means for detecting a position of the means for engaging relative to the profile, and a means for generating logging data.

In still another embodiment, a smart logging conveyance system includes a lowering mechanism, a drop-off tool, a hang-off tool coupled to the drop-off tool, a logging tool coupled to the hang-off tool and configured to generate logging data, and a suspension element coupled to the lowering mechanism and the drop-off tool. The suspension element supports the drop-off tool inside a tubular member. The drop-off tool includes a release latch configured to engage a fishing neck on the hang-off tool, a motor configured to actuate the release latch to disengage the hang-off tool, and a communication chassis configured to establish communication between the hang-off tool and the drop-off tool. The hang-off tool includes a radially expandable member that is configured to engage a radially-increased profile of an inner surface of the tubular member in an expanded position to support the hang-off tool and configured not to engage the radially-increased profile in a retracted position, and a computing system coupled to the logging tool and configured to communicate the logging data to the drop-off tool.

BRIEF DESCRIPTION OF THE DRAWINGS

For a more detailed description of the embodiments, reference will now be made to the following accompanying drawings.

DETAILED DESCRIPTION OF THE DISCLOSED EMBODIMENTS

In the drawings and description that follows, like parts are marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The invention is subject to embodiments of different forms. Some specific embodiments are described in detail and are shown in the drawings, with the understanding that the disclosure is to be considered an exemplification of the principles of the invention, and is not intended to limit the invention to the illustrated and described embodiments. The different teachings of the embodiments discussed below may be employed separately or in any suitable combination to produce desired results. The terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1:
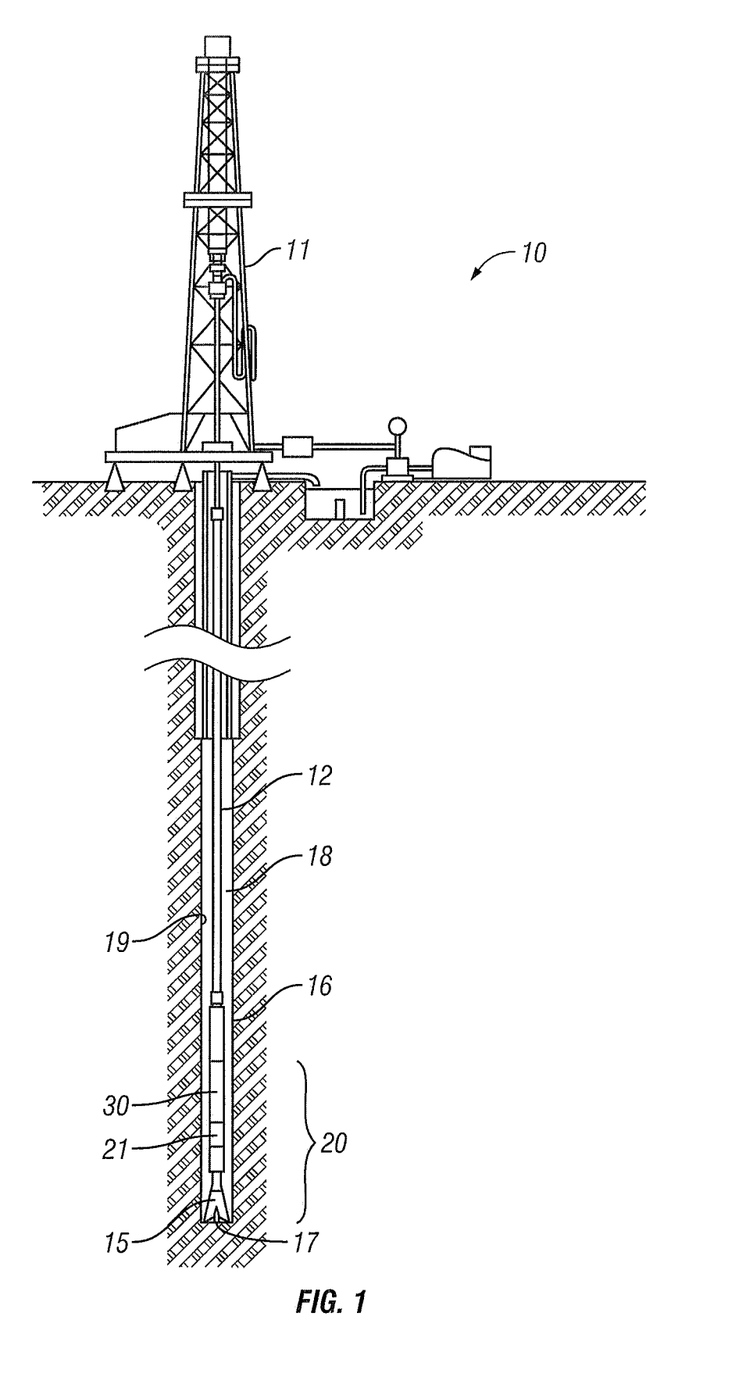
FIG. 1 shows a schematic view of an embodiment of a drilling system in accordance with various embodiments.

Referring now to FIG. 1, an example downhole drilling system 10 comprises a rig 11, a drill string 12, a Bottom Hole Assembly (BHA) 20 including drill collars 30, stabilizers 21, and the drill bit 15. With force or weight applied to the drill bit 15 via the drill string 12, the rotating drill bit 15 engages the earthen formation and proceeds to form a borehole 16 along a predetermined path toward a target zone. The drilling fluid or mud pumped down the drill string 12 passes out of the drill bit 15 through nozzles positioned in the bit. The drilling fluid cools the bit 15 and flushes cuttings away from the face of bit 15. The drilling fluid and cuttings are forced from the bottom 17 of the borehole 16 to the surface through an annulus 18 formed between the drill string 12 and the borehole sidewall 19.

Figure 2:
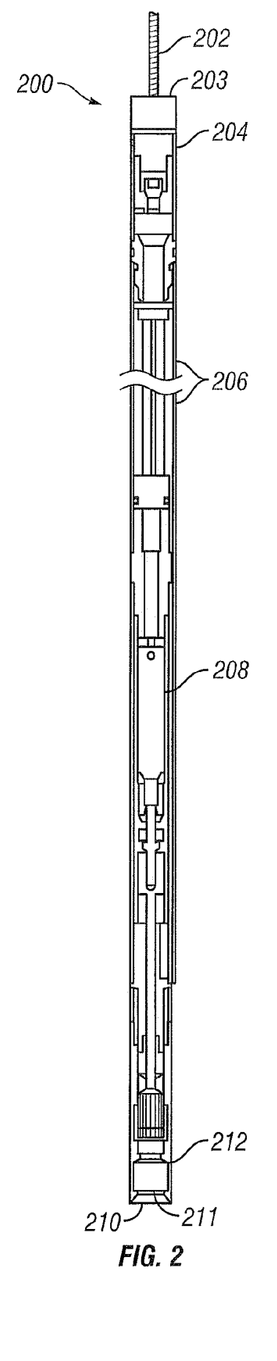
FIG. 2 shows a drop-off tool in accordance with various embodiments.

FIG. 2 shows a drop-off tool 200 in accordance with various embodiments. The drop-off tool 200 is lowered into and suspended in the wellbore inside the drill string 12 or another tubular member by suspension element 202 (e.g., a wireline or slickline). As an example, a wireline cable winch at the surface may be used to lower and suspend the drop-off tool 200; other lowering mechanisms could include a crane. The upper portion of the drop-off tool 200 comprises a female field joint 204 configured to mate with a cable head 203. The drop-off tool 200 also comprises an electronics chassis 206, which may distribute power to components of the drop-off tool 200 (e.g., to a motor 208) and provide a communications hub for signals being sent to or received from a system at the surface (not shown) or another tool. The electronics chassis 206 may house a computing system, which is discussed in further detail below.

The drop-off tool 200 further comprises a release latch 210, which is actuated by the motor 208, that couples to a fishing neck on another tool string. The release latch 210 may comprise one or more sensors 211 (e.g., proximity sensors, linear variable differential transformers, limit switches) that monitor the position of the release latch 210 relative to, for example, the fishing neck on the other tool string. The drop-off tool 200 also comprises a communication chassis 212 that couples to another tool string to provide communication between the drop-off tool 200 and the other tool string, for example wirelessly or through a wet connection. The communication chassis 212 may comprise connections (not shown) for the transmission of power and/or electric signals to another tool string. The release latch 210 and the communication chassis 212 will be discussed in further detail below.

Figure 3A:
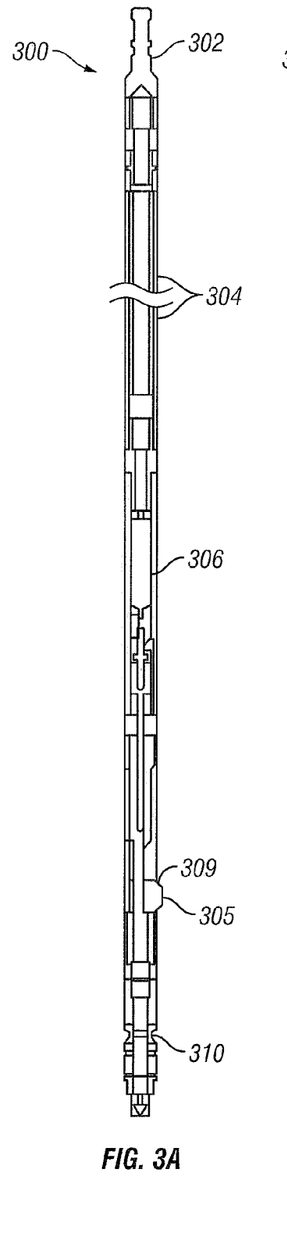
FIG. 3a shows a hang-off tool in accordance with various embodiments.

FIG. 3a shows a hang-off tool 300 in accordance with various embodiments. The upper end of the hang-off tool 300 comprises a fishing neck 302, which may be engaged by a release latch (e.g., release latch 210 of the drop-off tool 200). The fishing neck 302 may comprise connections (not shown) for the transmission of power and/or electric signals between the hang-off tool 300 and another tool that engages the fishing neck 302, such as the drop-off tool 200. The hang-off tool 300 also comprises an electronics chassis 304. The electronics chassis 304 may distribute power to components of the hang-off tool 300 (e.g., to a motor 306) and act as a communications hub for signals being sent to or received from a system at the surface (not shown) or another tool (e.g., the drop-off tool 200). The electronics chassis 304 may also house a computing system, which is discussed in further detail below. A male field joint 310 of the hang-off tool couples to a logging string (not shown) that generates logging data. As explained above, logging data may include common measurements such as pressure or temperature to advanced measurements such as rock properties, fracture analysis, fluid properties in the wellbore, or formation properties extending into the rock formation.

In accordance with various embodiments, the hang-off tool 300 comprises a radially expandable member 308. In FIG. 3a, the radially expandable member 308 comprises one or more expandable dogs. The dogs 308 are actuated by the motor 306, which causes the dogs 308 to move between a retracted position and an expanded position. In the retracted position, the dogs 308 do not extend beyond the outer diameter of the hang-off tool 300, which allows greater clearance between the outer diameter of the hang-off tool 300 and the drill string 12 or other tubular in which the hang-off tool 350 is suspended. However, in the expanded position, the dogs 308 extend beyond the outer diameter of the hang-off tool 300 to engage a radially increased profile of the drill string 12 or other tubular in which the hang-off tool 300 is suspended, which will be discussed in further detail below.

One or more sensors 309 are coupled to the electronics chassis 304 and, in particular, a computing system housed in the electronics chassis 304. The sensors 309 determine a position of the hang-off tool 300 relative to the drill string 12. The sensors 309 may comprise pressure transducers, proximity sensors, ultrasonic sensors, or the like. In some embodiments, the sensors 309 determine a position of a radially expandable member 308 relative to the drill string. For example, the sensors 309 may detect when the radially expandable member 308 is vertically aligned with a radially increased profile of the drill string or other tubular interior in which the hang-off tool 300 is suspended. In some embodiments, a portion of the drill string 12 (e.g., the radially increased profile) may comprise an element (e.g., a magnetic ring, not shown) that elicits a response from the sensors 309, indicating proximity of the sensors 309 to the element. In other embodiments, logging tools could be used to locate the bit (not shown) of the drill string 12 and the proximity to the radially increased profile could be inferred using sonic or resistivity information to differentiate between the drill string 12 and an open hole environment (i.e., below the bit).

Figure 3B:
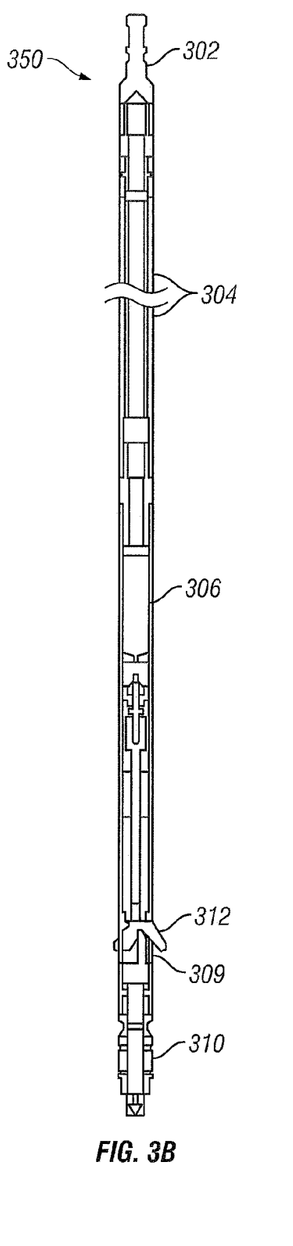
FIG. 3b shows an alternate hang-off tool in accordance with various embodiments.

FIG. 3b shows an alternate hang-off tool 350 in accordance with various embodiments. FIG. 3b is similar to FIG. 3a; however, in FIG. 3b, the hang-off tool 350 comprises a radially expandable member 312 that comprises one or more cam fingers. Similar to the dogs 308 shown in FIG. 3a, the cam fingers 312 are actuated by the motor 306, which causes the cam fingers 312 to move between a retracted position and an expanded position. In the retracted position, the cam fingers 312 do not extend beyond the outer diameter of the hang-off tool 350, which allows greater clearance between the outer diameter of the hang-off tool 350 and the drill string 12 or other tubular in which the hang-off tool 350 is suspended. However, in the expanded position, the cam fingers 312 extend beyond the outer diameter of the hang-off tool 350 to engage a radially increased profile of the interior drill string 12 or other tubular in which the hang-off tool 350 is suspended, which will be discussed in further detail below.

Figure 4A:
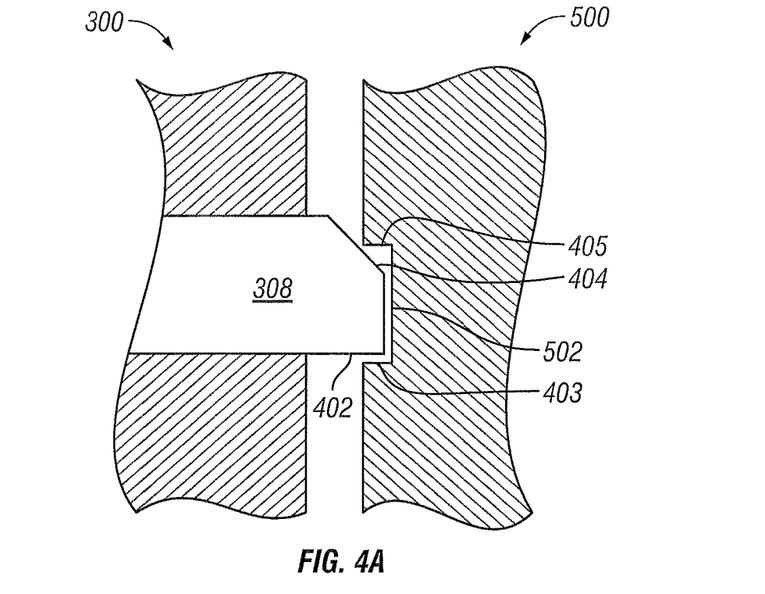
FIG. 4a shows an expanded view of a portion of a hang-off tool in accordance with various embodiments.

FIG. 4a shows an expanded view of the dogs 308 shown in FIG. 3a. As shown, the dogs 308 are in the expanded position and extend beyond the outer diameter of the hang-off tool 300. The dogs 308 engage a radially increased profile 502 of a tubular member 500 (e.g., drill string 12). The dogs 308 may be expanded (e.g., through actuation by the motor 306) when the sensors 309 indicate that the dogs 308 are vertically aligned with the profile 502. The dogs 308 may expand automatically when the sensors 309 indicate that the dogs 308 are vertically aligned with the profile 502. Alternately, command signals may be sent from a surface system when it is determined that the dogs 308 are vertically aligned with the profile 502. In some embodiments, the dogs 308 may be expanded when the sensors 309 indicate that the dogs 308 are below the profile 502 location, causing the dogs 308 to contact the inner diameter of the drill string 12. As the hang-off tool 350 is pulled up through the drill string 12, the dogs 308 exert an outward radial force, such that when the dogs 308 are adjacent to the profile 502, the dogs 308 automatically expand into the profile 502. A sensor 309 on the tool may confirm positive engagement of the profile 502.

In accordance with various embodiments, a lower surface 402 of each dog 308 is substantially perpendicular to the wellbore and the lower surface 403 of the profile 502 is also substantially perpendicular to the wellbore. Thus, when the lower surface 402 engages the profile surface 403 (e.g., when the weight of the hang-off tool 300 is no longer supported by the suspension element 202), the dogs 308 and the tubular member 500 support the weight of the hang-off tool 300 and prevent downward movement of the hang-off tool 300 relative to the tubular member 500.

The dogs 308 also comprise a sloped upper surface 405. In accordance with various embodiments, the sloped upper surface 405 contacts the upper surface 405 of the profile 502 in response to upward movement of the hang-off tool 300 relative to the tubular member 500, allowing the dogs 308 to at least partially retract. This enables the hang-off tool 300 to be removed to the surface even in the event that the hang-off tool 300 loses power or the ability to retract the dogs 308. Expansion of the dogs 308 permits the dogs 308 to engage the increased radial profile 502, and thus there is no need for a reduced radial profile (e.g., an interior shoulder) to support the hang-off tool 300. This enables the tubular member 500 to have a larger allowable inner diameter without any radial clearance problems, which allows for increased flexibility in selecting instrumentation and logging tools.

Figure 4B:
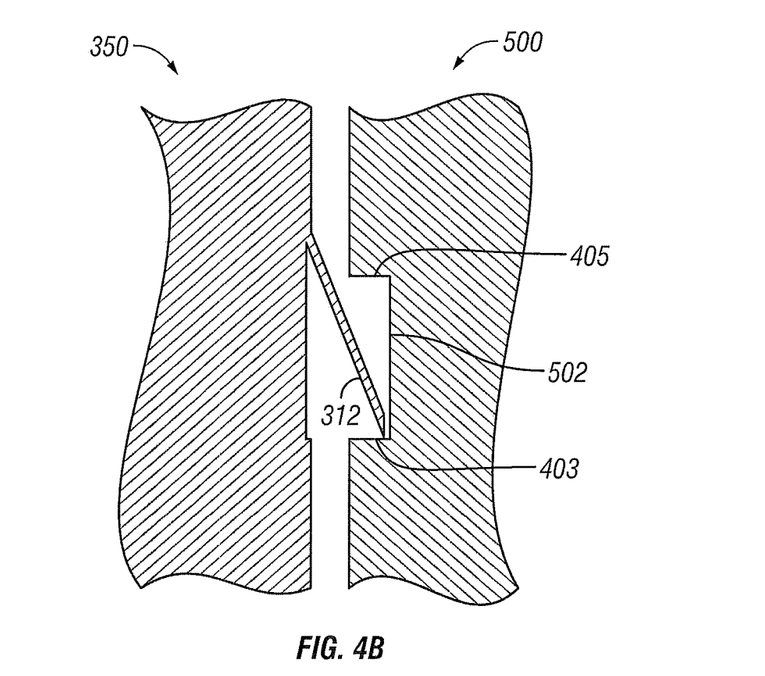
FIG. 4b shows an expanded view of a portion of an alternate hang-off tool in accordance with various embodiments.

FIG. 4b shows an expanded view of the cam fingers 312 shown in FIG. 3b. As shown, the cam fingers 312 are in the expanded position and extend beyond the outer diameter of the hang-off tool 350. The cam fingers 312 engage an increased radius profile 502 of the interior of tubular member 500 (e.g., drill string 12). The cam fingers 312 may be expanded (e.g., through actuation by the motor 306) when the sensors 309 indicate that the cam fingers 312 are vertically aligned with the profile 502. The cam fingers 312 may expand automatically when the sensors 309 indicate that the cam fingers 312 are vertically aligned with the profile 502. Alternately, command signals may be sent from a surface system when it is determined that the cam fingers 312 are vertically aligned with the profile 502. In some embodiments, the cam fingers 312 may be expanded when the sensors 309 indicate that the cam fingers 312 are below the profile 502 location, causing the cam fingers 312 to contact the inner diameter of the drill string 12. As the hang-off tool 350 is pulled up through the drill string 12, the cam fingers 312 exert an outward radial force, such that when the cam fingers 312 are adjacent to the profile 502, the cam fingers 312 automatically expand into the profile 502. A sensor 309 on the tool may confirm positive engagement of the profile 502.

In accordance with various embodiments, the cam fingers 312 have a downward angle in the extended position. Thus, when the cam fingers 312 are in the extended position and engage the lower surface 403 of the profile 502 (e.g., when the weight of the hang-off tool 350 is no longer supported by the suspension element 202), the cam fingers 312 and the tubular member 500 support the weight of the hang-off tool 350 and prevent downward movement of the hang-off tool 350 relative to the tubular member 500.

In accordance with various embodiments, the downward angle of the cam fingers 312 allows the cam fingers 312 to at least partially retract in response to upward movement of the hang-off tool 350 relative to the tubular member 500. This enables the hang-off tool 350 to be removed to the surface even in the event that the hang-off tool 350 loses power or the ability to actuate the cam fingers 312. As with the dogs 308 above, expansion of the cam fingers 312 also permits engagement of the increased radial profile 502, and thus there is no need for a reduced radial profile (e.g., a shoulder) on the interior of the tubular member 500 to support the hang-off tool 350. This enables the tubular member 500 to have a larger allowable inner diameter without any radial clearance problems, which allows for increased flexibility in selecting instrumentation and logging tools.

Figure 5:
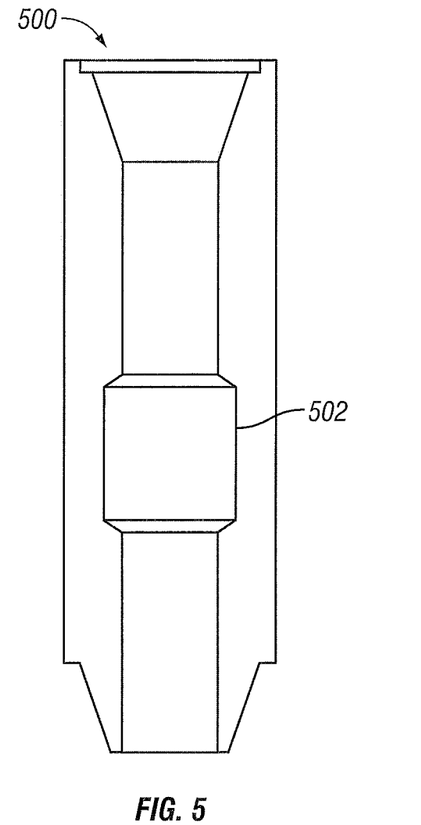
FIG. 5 shows a profile of a tubular in accordance with various embodiments.

FIG. 5 shows an exemplary radially increased profile 502 of a tubular member 500 (e.g., drill string 12). As explained above, the radially increased profile 502 is engaged as a result of a radially expandable member 308, 312 being actuated into an extended position and the hang-off tool 300, 350 is supported by the tubular member 500. Thus, the use of a radially reduced profile (e.g., a shoulder) on the inside of the tubular member 500 to support the hang-off tool 300, 350 is unnecessary. This enables the hang-off tool 300, 350 to have a larger allowable outer diameter without any radial clearance problems, which allows for increased flexibility in selecting instrumentation and logging tools.

Referring again to FIGS. 2, 3a, and 3b, the release latch 210 of the drop-off tool 200 is configured to couple to the fishing neck 302 of the hang-off tool 300, 350. The motor 208 actuates the release latch 210 to disengage the fishing neck 302, allowing the drop-off tool 200 to be retrieved to the surface when the hang-off tool 300, 350 is supported by the radially expandable member 308, 312. In some embodiments, the release latch 210 mechanically engages the fishing neck 302 and only requires power (e.g., actuation from the motor 208) to disengage the fishing neck 302. Thus, if the drop-off tool 200 loses power, the release latch 210 remains coupled to the fishing neck 302, permitting the drop-off tool 200 and hang-off tool to be retrieved to the surface for inspection or repair. Additionally, the release latch 210 may re-engage the fishing neck 302 regardless of whether the drop-off tool 200 has power. In some embodiments, an overshot in the release latch 210 may utilize a basket or spiral grapple to engage the fishing neck 302.

The communication chassis 212 of the drop-off tool 200 enables electrical communication (e.g., electrical signals, alternating or direct current) between the drop-off tool 200 and the hang-off tool 300, 350. The fishing neck 302 may include corresponding communication devices, such as wireless transceivers, electrical connections, and the like to enable communication between the hang-off tool 300, 350 and the drop-off tool 200. In addition to routing power from the surface to the hang-off tool 300, 350, the communication chassis 212 also facilitates transmission of electrical signals between the surface and the computing system 304. For example, a system at the surface generates signals to control the operation of the motor 306 and the communication chassis 212 transmits these signals to the hang-off tool 300, 350. Additionally, signals representing information received from the sensors 309 or the logging tool (not shown) coupled to the hang-off tool 300, 350 are passed to the drop-off tool 200 through the communication chassis 212.

The computing system in the electronics chassis 206 of the drop-off tool 200 may send signals to or receive signals from a system at the surface (not shown) via the suspension element 202. The signals may include data gathered from downhole tools such as a logging tool or the sensors 211. The signals also may include commands from the surface system to carry out an action, such as using the motor 208 to actuate the release latch 210. The computing system 206 also may transmit signals to or receive signals from another tool, such as the hang-off tool 300, 350, via the communications chassis 212.

Similar to the computing system 206, the computing system in the electronics chassis 304 of the hang-off tool 300, 350 may send signals to or receive signals from the surface system (not shown) via a communication path (e.g., through some combination of the fishing neck 302, the communications chassis 212, the computing system 204 and the suspension element 202). The signals may include data gathered from downhole tools such as a logging tool coupled to the male field joint 310 or from the sensors 309. The signals also may include commands from the surface system to carry out an action, such as using the motor 306 to actuate the radially expandable member 308.

In accordance with various embodiments, the computing system 304 is configured to store information received from the sensors 309 or the logging tool when the hang-off tool 300, 350 is not coupled to the drop-off tool 200. The stored information may be retrieved when the hang-off tool 300, 350 is removed to the surface. Alternately, the stored information may be transmitted through the drop-off tool 200 to the surface when the release latch 210 of the drop-off tool 200 re-engages the fishing neck 302 of the hang-off tool 300, 350. Thus, the drop-off tool 200 may be separated from the hang-off tool 300, 350 while maintaining the information from the sensors 309 and the logging tool for retrieval.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A hang-off tool for support inside a tubular member in a well, comprising:
   a logging string configured to generate logging data;
   a computing system coupled to the logging string and configured to communicate the logging data to another tool in the well; and
   a radially expandable member having a retracted position and an expanded position, the radially expandable member not being biased to either position;
   wherein the radially expandable member is configured to engage a radially-increased profile of an inner surface of the tubular member in the expanded position to support the hang-off tool rotatably relative to the tubular member;
   wherein the radially expandable member is configured not to engage the radially-increased profile in the retracted position; and
   wherein the radially expandable member is retractable when moved upward out of the radially-increased profile and engaged by the inner surface of the tubular member such that the hang-off tool may be retrieved from the tubular.

2. The hang-off tool of claim 1 wherein the radially expandable member comprises one or more dogs.

3. The hang-off tool of claim 2 wherein the one or more dogs comprises a sloped upper surface that causes the dogs to retract as the dogs are moved upward relative to the radially-increased profile.

4. The hang-off tool of claim 1 wherein the radially expandable member comprises one or more cam fingers.

5. The hang-off tool of claim 4 wherein the cam fingers have a downward angle in the extended position such that the cam fingers retract in response to upward movement of the tool relative to the radially-increased profile.

6. The hang-off tool of claim 1 further comprising one or more sensors coupled to the computing system and configured to:
   determine a position of the radially expandable member relative to the profile;
   determine the position of the radially expandable member relative to the hang-off tool; and
   generate position data indicative of the determined positions.

7. The hang-off tool of claim 6 wherein the computing system is configured to transmit the position data to an operator at the surface.

8. The hang-off tool of claim 1 wherein the computing system comprises a memory configured to store logging data from the logging string.

9. The hang-off tool of claim 8 wherein:
   the computing system is configured to transmit logging data to a surface computing system when the hang-off tool is coupled to the surface computing system; and
   the computing system is configured to store logging data in the memory when the hang-off tool is decoupled from the surface computing system.

10. A hang-off tool for inside a tubular member, comprising:
    a means for engaging a profile of an inner surface of the tubular member;
    a means for detecting a position of the means for engaging relative to the profile;
    a means for generating logging data; and
    wherein upward movement of the hang-off tool relative to the tubular member causes the means for engaging to at least partially retract from an expanded position due to engagement with the inner surface of the tubular member.

11. The hang-off tool of claim 10 wherein the means for engaging prevents downward movement of the hang-off tool relative to the tubular member when the means for engaging is in an expanded position.

12. The hang-off tool of claim 10 further comprising:
    a means for storing the logging data when the hang-off tool is de-coupled from a surface computing system; and
    a means for transmitting the data to the surface computing system when the hang-off tool is coupled to the surface computing system.

13. A smart logging system, comprising:
    a lowering mechanism;
    a drop-off tool;
    a hang-off tool coupled to the drop-off tool;
    a logging tool coupled to the hang-off tool and configured to generate logging data; and
    a suspension element coupled to the lowering mechanism and the drop-off tool, the suspension element supports the drop-off tool inside a tubular member;
    wherein the drop-off tool comprises:
       a release latch configured to engage a fishing neck on the hang-off tool;
       a motor configured to actuate the release latch to disengage the hang-off tool; and
       a communication chassis configured to establish communication between the hang-off tool and the suspension element;
    wherein the hang-off tool comprises:
       a radially expandable member that is configured to engage a radially-increased profile of an inner surface of the tubular member in an expanded position to support the hang-off tool rotatably relative to the tubular member, configured not to engage the radially-increased profile in a retracted position, and configured to retract when moved upward out of the radially-increased profile and engaged by the inner surface of the tubular member such that the hang-off tool may be retrieved from the tubular; and a computing system coupled to the logging tool and configured to communicate the logging data to the drop-off tool.

\* \* \* \* \*